United States Patent [19]

Oishi et al.

[11] Patent Number: 4,977,474
[45] Date of Patent: Dec. 11, 1990

[54] MAGNETIC TAPE CARTRIDGE REQUIRING UNIFORM FORCE DURING LEADER BLOCK ATTACHMENT AND DETACHMENT

[75] Inventors: Kengo Oishi; Seizi Odate, both of Kanagawa, Japan

[73] Assignee: Fuji Photo Film Co., Ltd., Kanagawa, Japan

[21] Appl. No.: 302,275

[22] Filed: Jan. 27, 1989

[30] Foreign Application Priority Data

| Feb. 1, 1988 | [JP] | Japan | 63-11165 |
| Feb. 1, 1988 | [JP] | Japan | 63-11166 |
| Feb. 24, 1988 | [JP] | Japan | 63-22317 |

[51] Int. Cl.$^5$ .............................. G11B 23/02
[52] U.S. Cl. ..................... 360/132; 360/95; 242/195; 226/92
[58] Field of Search ............ 360/128, 132, 95; 242/198, 199, 195, 147; 226/91, 92

[56] References Cited

U.S. PATENT DOCUMENTS

| 4,452,406 | 6/1984 | Richard | 342/195 |
| 4,681,278 | 7/1987 | Smith | 242/195 |
| 4,717,090 | 1/1988 | Smith et al. | 360/95 |
| 4,775,115 | 10/1988 | Gelardi | 360/132 |

*Primary Examiner*—John H. Wolff
*Assistant Examiner*—Alfonso Garcia

*Attorney, Agent, or Firm*—Sughrue, Mion, Zinn, Macpeak & Seas

[57] ABSTRACT

A magnetic tape cartridge including a tape cartridge having a tape outlet at least partially defined by a partition wall and a side wall, a tape reel rotatably disposed in the tape cartridge and having a magnetic tape wound therearound and a leader block for securing an end of the tape and being detachably disposed in the tape outlet. The leader block has at one end thereof a curved surface for contacting a portion of the partition wall and at another end thereof an abutting member for abutting against the side wall of the cartridge. The side wall of the cartridge is deformable to allow for attachment and detachment of the leader block. A relief portion is provided on the partition wall such that when the leader block is rotated about a point of contact between the curve surface of the leader block and the portion of the partition wall so as to be attached and detached to the tape outlet, the point of contact is disposed between a longitudinal center line of the leader block and a point located inwardly of the center line with respect to the cartridge. The abutting member has a low coefficient of friction such that the forces required to attach and detach the leader block to the tape outlet is uniform. Further, a projection is formed on a portion of the abutting member so as to uniformly deform the side wall.

5 Claims, 6 Drawing Sheets

MAGNETIC TAPE CARTRIDGE REQUIRING UNIFORM FORCE DURING LEADER BLOCK ATTACHMENT AND DETACHMENT

BACKGROUND OF THE INVENTION

1. Field of the Invention

This invention relates to a magnetic tape cartridge and more particularly to a magnetic tape cartridge holding therein a single reel on which a magnetic tape is wound and including a leader block holding an end of the tape, which leader block is attachable to and detachable from a tape outlet.

2. Background

Figure 1:
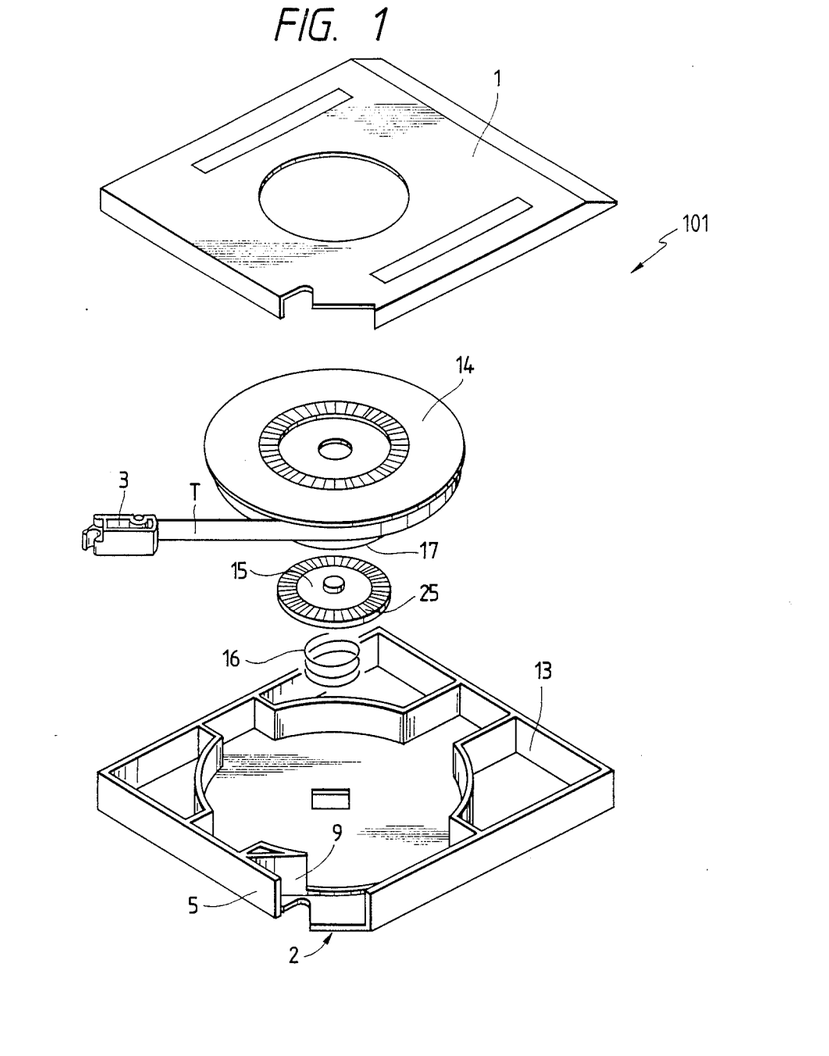
FIG. 1 is an exploded, perspective view of a conventional magnetic tape cartridge.
Figure 2:
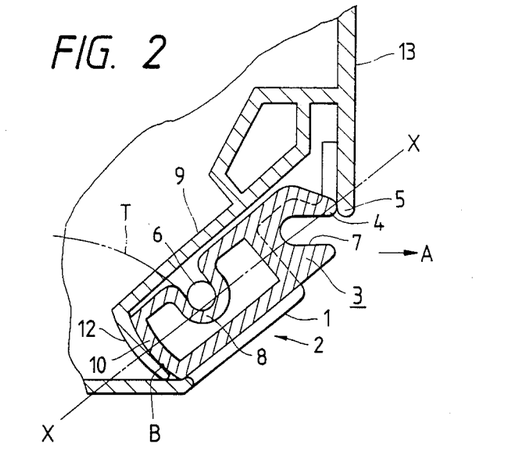
FIG. 2 is a cross-sectional view of a leader block of the conventional magnetic tape cartridge.

Conventionally, magnetic tape cartridges used as a recording medium for a computer or the like include a magnetic tape cartridge in which a magnetic tape T is would on a single reel 14. The reel 14 is rotatably contained in a cartridge 101 composed of an upper case 13 and a lower case 1, as shown in FIG. 1. As illustrated in FIG. 2, when the magnetic tape cartridge is not in use, a leader block 3, attached to the leading tape end, is detachably engaged in a tape outlet 2 formed in a corner of the cartridge 101 and retained there to prevent the reel 14 from accidental angular movement, with the magnetic tape T completely wound therearound.

The reel 14 has a hub 17 at a center portion thereof and the hub 17 has an annular wall which, upon assemblage of the cartridge, is disposed in surrounding relation to a brake button 15 mounted on the lower case 1 and held in an urged condition by a coil spring 16. Braking teeth 25 of a serrated shape are formed on an outer peripheral portion of the lower face of the brake button 15 and circumferentially spaced from one another. The braking teeth are meshingly engaged with braking teeth (not shown) formed on the reel 14 and disposed within the hub 17 so as to prevent the accidental angular movement of the reel 14. The cartridge 101, when in use, is loaded into the device such as a computer, and for example, a rotatable shaft of a motor is introduced into the cartridge 101 and is brought into engagement with the brake button 15 to urge the button inwardly of the cartridge 101 against the bias of the coil spring 16. As a result, the locking of the reel 14 is released so that the reel 14 can be rotated.

Thereafter, a withdrawing pin (not shown) provided in the above-mentioned device is suitably engaged with the leader block 3 disposed in the tape outlet 2, so that the leader block 3 is withdrawn exteriorly of the cartridge 101 and is connected to a take-up reel in the device in a unitary manner to enable the travel of the tape.

Figure 3:
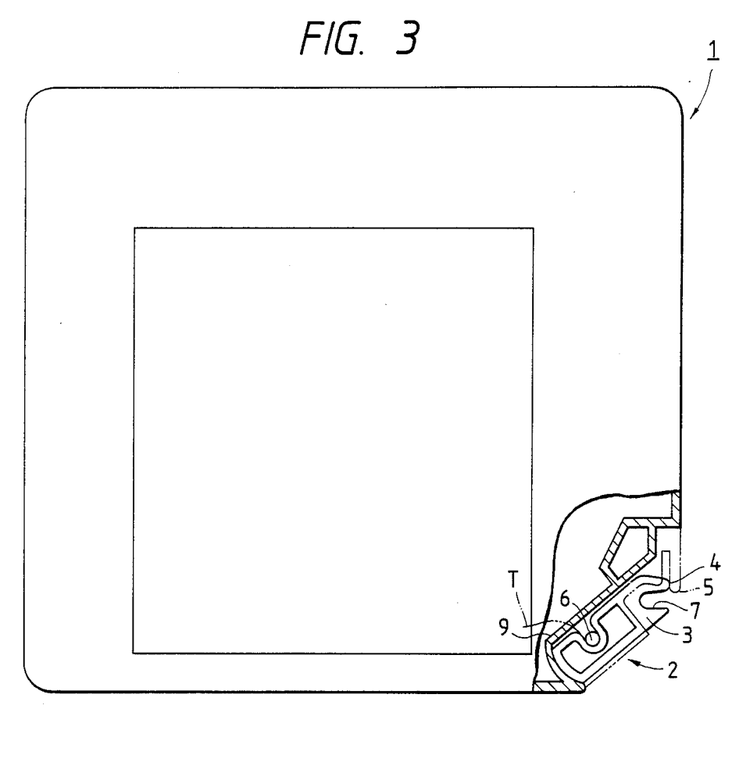
FIG. 3 is a schematic plan view of a conventional magnetic tape cartridge.

As shown in FIGS. 2 and 3 the leader block 3 comprises a resin block having a generally rectangular horizontal cross-section. The leader block 3 has at a front end thereof a withdrawal engaging portion 7 having a generally cylindrical stepped inner peripheral surface extending in the direction of the width of the case. The withdrawing pin provided in the device such as a computer is engageable in the withdrawal engaging portion 7. A rear end face of the leader block 3, opposing the withdrawal engaging portion 7, is formed into a curved surface 10 which has the same curvature in a horizontal direction as the outer peripheral surface of the take-up reel in the device, so as to form part of the outer peripheral surface of the take-up reel when the leader block 3 is connected to the take-up reel. Also, the leader block 3 has a recess 8 having a generally cylindrical peripheral surface formed in a side face of the leader block 3 directed inwardly in the case. The recess 8 serves to clamp the leading end of the magnetic tape T in cooperation with a clamp member 6.

Partition walls 9 for suitably holding the leader block 3 in position are provided at the tape outlet 2 and are formed on the inner surfaces of the upper and lower cases 13 and 1, respectively. The partition walls 9 correspond in shape to the side face of the leader block 3 directed inwardly of the case and the curved surface 10 so as to hold the leader block 3 against movement in a horizontal direction. The portion of a side wall 5 of the upper case 13 disposed forwardly of a front end portion 4 of the leader block 3 and in opposed relation thereto is adapted to be abutted against the front end portion 4 when the leader block 3 is attached and detached. The side wall 5 can be suitably deformed so that the leader block 3 can be attached and detached.

Therefore, in accordance with the degree of abutment of the front end portion 4 against the side wall 5 at the time of attaching and detaching the leader block 3, the force required for attaching the leader block 3 as well as the force for withdrawing is determined.

Figure 4:
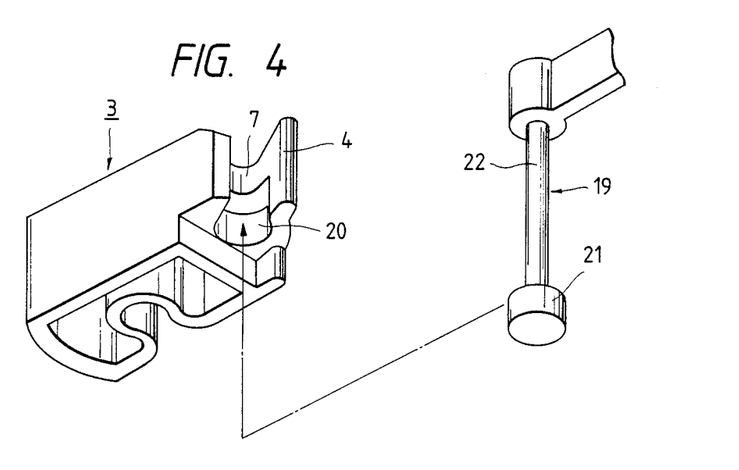
FIG. 4 is a perspective view showing a leader block and a withdrawing pin in a disengaged condition according to the conventional magnetic tape cartridge.

Referring to FIG. 4, the withdrawing pin 19 is suitably fitted in the withdrawal engaging portion 7 so as to effect the attachment and detachment of the leader block 3. More specifically, the leader block 3 has a stepped recess 20 of a generally cylindrical shape formed adjacent to a lower end of a withdrawal engaging portion 7 and having a diameter greater than a groove width of the withdrawal engaging portion 7. The withdrawing pin 19 has a shoulder portion 21 formed at a front end of its body 22 so as to be correspondingly fitted in the stepped recess 20. When the magnetic tape cartridge is loaded into the device such as a computer, the pin body 22 is first received in the withdrawal engaging portion 7 from the front end of the leader block 3, and then the cartridge is moved downwardly, so that the shoulder portion 21 is fitted in the stepped recess 20 of the leader block 3. Then, when the withdrawing pin 19 is moved in a horizontal direction, the leader block 3 is also withdrawn exteriorly of the cartridge in such a manner that the leader block is kept integral with the shoulder portion 21.

When the withdrawing pin 19 is horizontally moved exteriorly of the case in a direction indicated by an arrow A in FIG. 2, the leader block 3 is rotatably moved horizontally about a fulcrum defined by a point B of contact between the curved surface 10 and a curved portion 12 of the partition wall 9 disposed in opposed relation thereto. Thus, the front end portion 4 resiliently deforms the side wall 5 and is withdrawn exteriorly of the cartridge, with its front end first moved out of the cartridge. When the leader block 3 is to be attached to the tape outlet 2, the leader block 3 is inserted into the tape outlet 2 by the withdrawing pin 19, with its rear end first introduced. Upon engagement of the curved surface 10 with the curved portion 12 of the partition wall 9, the leader block 3 is rotatably moved horizontally about the contact point B in a direction reverse to the direction of movement at the time of the withdrawing operation. As a result, the front end portion 4 resiliently deforms the side wall 5, so that the leader block 3 is attached to the tape outlet 2.

Each time the leader block 3 is attached to and detached from the tape outlet 2, the withdrawing pin 19 is subjected to a bending force resulting from the attaching force or the withdrawing force for resiliently deforming the side wall 5 to attach or detach the leader block 3 with respect to the tape outlet 2. Thus, the withdrawing pin is repeatedly subjected to a bending force. Therefore, in order to prevent the deformation of the withdrawing pin, it is necessary that irregularities in the withdrawing force and attaching force, as well as these forces per se, be small.

However, the contact point B serving as the fulcrum for the horizontal rotational movement of the leader block 3 is disposed, with respect to the cartridge, outwardly of an extension of a straight line (which coincides with the center line X—X of the leader block 3) interconnecting a point of action (the portion where the front end portion 4 is abutted against the side wall 5) and a point of force (the engaging portion of the withdrawal engaging portion 7 on which the force of horizontal movement of the withdrawing pin acts).

When the leader block 3 is rotatably moved horizontally by the withdrawing pin about the contact point B so as to attach or detach the leader block with respect to the tape outlet 2, the attaching force acting on the withdrawing pin when the front end portion 4 resiliently deforms the side wall 5 to be received in the tape outlet 2 is greater than the withdrawing force acting on the withdrawing pin when the front end portion 4 resiliently deforms the side wall 5 to be withdrawn from the tape outlet 2, due to the relationship of dynamical positions of the point of action, the point of force and the fulcrum. Therefore, it has been difficult to stabilize the forces for attaching and detaching the leader block 3.

Furthermore, the case 1 as well as the leader block 3 must be made of a material which meets the flame retardant requirements (UL94V-2) to protect data in case of emergency, and for this reason, mainly, a polycarbonate resin is used. However, molded products of the flame retardant plastic resin such as a polycarbonate resin are subjected to large irregularities in dimensions In addition, such a resin has a high coefficient of friction although its wear resistance is high. Therefore, it has been difficult to stabilize the attaching and detaching forces for the leader block 3.

Figure 5:
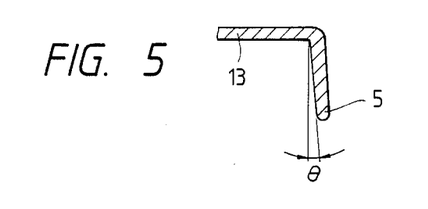
FIG. 5 is a fragmentary vertical cross-sectional view of a side wall of an upper case according to the conventional magnetic tape cartridge.

In addition, the flame retardant plastic resin, such as a polycarbonate resin, has a low mold shrinkage factor and a high coefficient of friction, and therefore as seen from the upper cartridge 3 in FIG. 5, the side wall 5 has a relatively large release inclination of $\theta$ so that the molded upper cartridge can easily be released from the mold, when molding the upper and lower cartridges.

Therefore, when the leader block 3 is attached and detached, the surface of contact of the front end portion 4 and side wall 5 is not uniform, rather the front end portion 4 and the side wall 5 are partially abutting each other proximate the side wall 5.

Furthermore, the position where the withdrawing pin 19 acts on the stepped recess 20 of the leader block 3 to apply the attaching and detaching force thereto is spaced from the position where the front end portion 4 of the leader block 3 acts on the side wall 5 to apply the abutting force thereto to suitably deform the same, and the directions of of these forces are inconsistent with each other. Therefore, each time the leader block is attached or detached, a twisting force is in some cases exerted on the withdrawing pin, so that the effective attaching and detaching force is increased, and in an extreme case, the withdrawing pin has been deformed.

SUMMARY OF THE INVENTION

The present invention has been made in view of the above problem, and accordingly, the object of the invention is to provide a magnetic tape cartridge of the type which can stabilize the forces for attaching and detaching the leader block.

The above object and other objects which will become apparent from the ensuing description of the preferred embodiment are accomplished according to the present invention by a magnetic tape cassette, comprising a tape cartridge having a tape outlet at least partially defined by a partition wall and a side wall; a tape reel rotatably disposed in the tape cartridge and having a magnetic tape wound therearound; a leader block for securing an end of the tape and being detachably disposed in the tape outlet, the leader block having at one end thereof a curved surface for contacting a portion of the partition wall and having at another end thereof an abutting member for abutting against the side wall of the cartiridge, the side wall being deformable to allow for attachment and detachment of the leader block, wherein a relief portion is provided on the partition wall so that when the leader block is rotated about a point of contact between the curved surface of the leader block and the portion of the partition wall so as to be attached and detached to the tape outlet, the point of contact is disposed between a longitudinal center line of the leader block and a point located toward the center of the cartridge from the center line.

According to another aspect of the invention, a front end portion of the leader block which is abutted against at least part of a side wall of the cartridge so as to suitably deform the side wall at the time of attachment and detachment of the leader block is constituted by a member of a low coefficient of friction.

According to further aspect of the invention, a projection is formed on a lower portion of the front end portion of the leader block, and the projection is abutted against the part of a side wall of the cartridge so as to suitably deform the side wall.

More specifically, when the leader block is attached and detached, the front end portion is not abutted against the side wall in the vicinity of its proximal portion but is abutted, through the projection formed at the lower portion of the front end portion, against the side wall in the vicinity of an open end of the side wall at a position near the median plane of the cartridge to thereby suitably deform the side wall. Therefore, the position where the withdrawing pin applies the attaching and detaching force to the stepped recess of the leader block and the position where the front end portion of the leader block applies the abutting force to the side wall to suitably deform the same are disposed in a generally common plane, so that the attaching and detaching force acts on the withdrawing pin in a generally horizontal direction.

PREFERRED EMBODIMENT OF THE PRESENT INVENTION

An embodiment of the present invention will now be described with reference to the drawings.

A magnetic tape cartridge according to the present invention, like the conventional magnetic tape cartridge, comprises a single reel 14 on which a magnetic tape T is wound, a tape cartridge case composed of an upper cartridge 13 and a lower cartridge 1 in which case the reel 14 is rotatably contained, and a lead block 3 attachable to and detachable from a tape outlet 2 provided in a corner of the tape cartridge case, as illustrated in FIGS. 1 and 2.

A leader block 3 is so designed as to be attachable to and detachable from a tape outlet 2 formed at a corner of a case of a magnetic tape cartridge, and has a recess 8 for clamping an end of a magnetic tape T by a clamp member 6. The recess has a generally cylindrical inner peripheral surface, a withdrawal engaging portion 7 in which a withdrawing pin provided in a device such as a computer is suitably engageable, and a curved surface 10 connectable with a take-up reel within the device in a unitary manner so as to form an outer peripheral surface of the reel, as is the case with the prior art.

Figure 6:
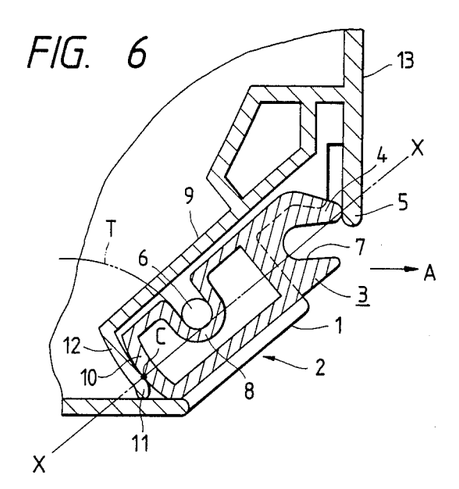
FIG. 6 is a cross-sectional view of a leader block of a magnetic tape cartridge according to one embodiment of the present invention.

FIG. 6 is a cross-sectional view of an important aspect of the magnetic tape cartridge according to the present invention. The leader block 3, like a conventional leader block, comprises a resin block having a generally rectangular horizontal cross-section, the leader block having at its front end portion a withdrawal engaging portion 7 in which a withdrawing pin provided in a device such as a computer is adapted to be suitably fitted. The end face of the leader block opposite to its front end is formed into a curved surface 10 which serves to form part of an outer peripheral surface of a take-up reel in the above device when the leader block is connected to this take-up reel in a unitary manner. An end of the tape is clamped to one side face of the leader block by a clamp member 6.

The tape outlet 2 for holding the leader block 3 is formed by partition walls 9 and upper and lower walls of the cartridge so as to hold the leader block 3 in position. The partition walls 9 are formed on the inner surfaces of the upper and lower cartridges 13 and 1, respectively, and correspond in shape to the side face of the leader block 3 directed inwardly of the cartridge case and the curved surface 10 at the rear end of the leader block 3. A front end portion 4 of the leader block 3, remote from the curved surface 10, is designed so as to abut against a portion of a side wall 5 of the upper cartridge 13 opposing the front end portion 4 when the leader block is attached and detached. The side wall 5 is suitably deformed to allow the attachment and detachment of the leader block 3.

A curved portion 12 of the partition wall 9 opposing the curved surface 10 has a relief portion 11 at its one end portion disposed adjacent to the outer periphery of the cartridge, the relief portion 11 being suitably curved in a direction away from the curved surface 10. Because of the provision of the relief portion 11, those portions of the opposed surfaces of the curved surface 10 and curved portion 12, disposed outwardly of the longitudinal center line X—X of the leader block 3 with respect to the cartridge, cooperate with each other to form a gap therebetween.

When the leader block 3 is to be withdrawn, the withdrawing pin is inserted into the withdrawal engaging portion 7 and then is horizontally moved outwardly of the case in a direction indicated by an arrow A, so that the leader block 3 is rotatably moved horizontally about a point C of contact between the curved surface 10 and the curved portion 12, which point serves as a fulcrum. As a result, the front end portion 4 resiliently deforms the side wall 5, so that the leader block 3 is withdrawn exteriorly of the tape cartridge case, with its front end portion first removed from the cartridge case. At this time, since the gap is formed between those portions of the opposed surfaces of the curved surface 10 and curved portion 12 disposed outwardly of the center line X—X of the leader block 3 with respect to the cartridge because of the provision of the relief portion 11, the point C of contact between the curved surface 10 and the curved portion 12 lies on the above center line X—X when the leader block 3 is rotatably withdrawn from the tape outlet 2.

Therefore, the contact point C, that is, the fulcrum for the horizontal swinging movement of the leader block 3, can lie on an extension of a straight line (the above-mentioned center line X—X) interconnecting a point of action (the portion where the front end portion 4 is abutted against the side wall 5) and a point of force (the engaging portion of the withdrawal engaging portion on which the force of horizontal movement of the withdrawing pin acts).

Therefore, when the leader block 3 is rotatably removed or attached by the withdrawing pin about the contact point C, the attaching force acting on the withdrawing pin when the front end portion 4 is received in the tape outlet 2 against the resiliency of the side wall 5 can be less than the attaching force required for the conventional magnetic tape cartridge, due to the relationship of dynamical positions of the point of action, the point of force and the fulcrum. Therefore, this attaching force can be reduced to a load generally equal to the withdrawing force acting on the withdrawing pin when the front end portion 4 is withdrawn from the tape outlet 2. Therefore, the attaching and detaching forces for the leader block 3 can be stabilized.

In the above embodiment, although the curved portion 12, which is part of the partition wall 9, has the relief portion 11 at its end portion adjacent to the outer periphery of the cartridge so that the fulcrum for the swinging horizontal movement of the leader block 3 can be disposed between the longitudinal center line X—X of the leader block 3 and a point disposed inwardly of this longitudinal center line X—X with respect to the cartridge, the present invention is not to be restricted to this embodiment. For example, the partition wall 9 may be so modified in shape that the curved portion 12 corresponding in shape to the curved surface 10 is formed into a linear configuration so that the curved surface 10 and the curved portion 12 are in contact with each other only on the center line X—X. Further, the partition wall 9 may be modified in shaped in other various ways so long as the fulcrum for the horizontal swinging movement of the leader block 3 is disposed between the above center line X—X and a point disposed inwardly of this center line X—X of the leader block with respect to the cartridge.

Figure 7:
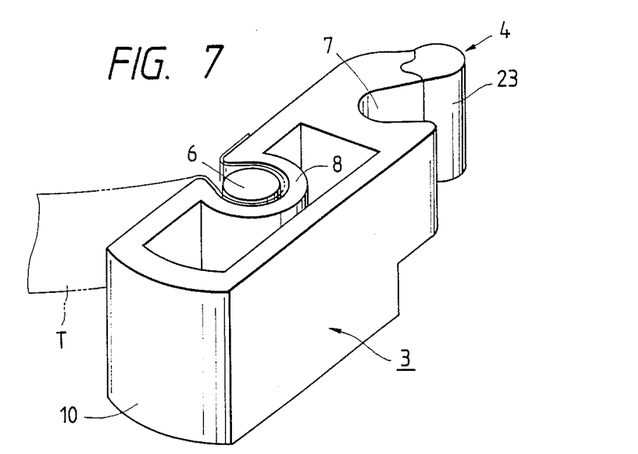
FIG. 7 is a perspective view of a leader block of a magnetic tape cartridge according to another embodiment of the present invention.

According to a second embodiment of the invention, as illustrated in FIG. 7, the front end portion 4 is comprised of an abutting member 23 made of a material of a low friction coefficient such as a polyoxymethylene resin and a polyamide resin and press-fitted in recess formed in the body of the leader block. At the time when the leader block 3 is attached to and detached from the tape outlet, the abutment member 23 is abutted against the side wall of the case.

Therefore, the frictional resistance between the front end portion 4 of the leader block and the side wall of the case is small, and therefore the forces for attaching and detaching the leader block 3 are small and can be stabilized. Therefore, the proper attaching and detaching forces can be set quite easily. No excessive load develops between the front end portion 4 and the side wall of the case, and therefore troubles such as breakage of the case, breakage of the block and bending deformation of the withdrawing pin can be avoided.

Further, according to the present invention, only the front end portion of the leader block 3 is made of a material of a low friction coefficient, and the body of the leader block can be made of a flame retardant material such as a polycarbonate resin as in the conventional construction. Therefore, the safety of the data protection in case of emergency will not be affected at all.

Figure 8:
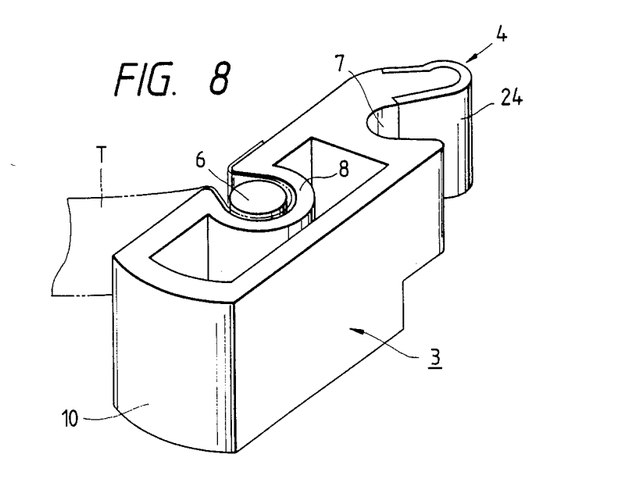
FIG. 8 is a perspective view of a leader block according to still another embodiment of the present invention.

In the above embodiment, although the abutment member is press-fitted in the recess in the body of the leader block to form the front end portion, the present invention is not to be restricted to this embodiment. For example, as shown in FIG. 8, a sheet-like abutment member 24 made, for example, of a ultra-high-molecular-weight polyethylene may be bonded to a peripheral surface of a front end portion 4, and many other modifications may be possible. Further, the material of which the abutment member is made is not limited to a polyoxymethylene resin, a polyamide resin and a polyethylene resin, and other materials having a low coefficient of friction can be used.

Figure 9:
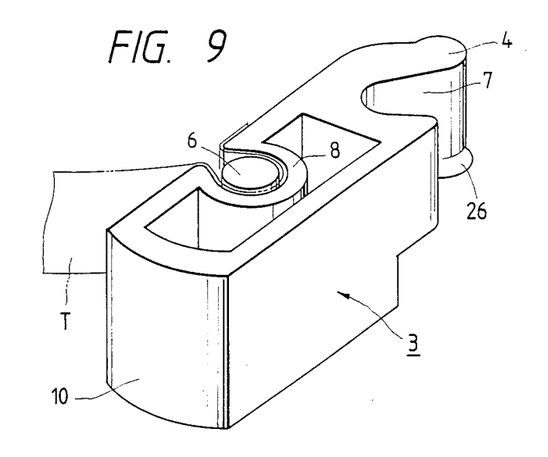
FIG. 9 is a perspective view of a leader block of a magnetic tape cartridge according to a further embodiment of the present invention.
Figure 10:
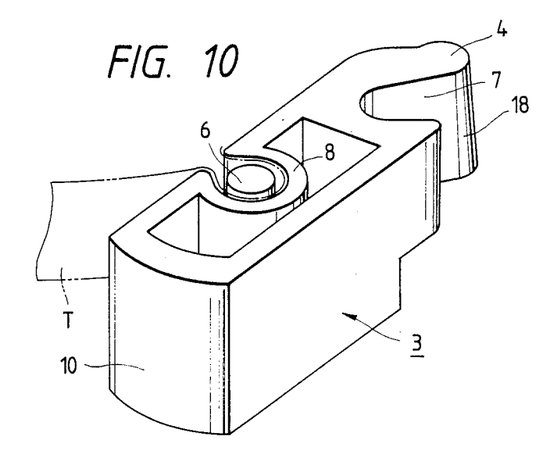
FIG. 10 is a perspective view of a leader block of yet another embodiment of the present invention.

According to a further embodiment of the invention, as illustrated in FIGS. 4 and 9, the front end portion 4 has a projection in the form, for example, of a semi-spherical projection 26 formed near a stepped recess 20 provided at its lower portion. When the leader block 3 is attached to or detached from the tape outlet, the side wall 5 is not abutted with the upper portion of the front end portion 4 at the proximal portion of the side wall but is abutted with the semi-spherical projection 26 near the stepped recess 20 at a position closer to the open end of the side wall 5, although the side wall 5 has a release inclination of $\theta$ so as to slant outwardly toward its open end, as illustrated in FIGS. 5 and 10.

Therefore, the position where the shoulder portion 21 of the withdrawing pin 19 acts on the stepped recess 20 of the leader block 3 to apply the attaching and detaching force thereto and the position where the front end portion 4 of the leader block 3 acts on the side wall 5 to apply the abutting force thereto to suitably deform the same are disposed in a generally common plane, so that a twisting force exerted on the withdrawing pin 19 is small. Therefore, the attaching and detaching forces for the leader block are made stable, and troubles such as bending deformation of the withdrawing pin can be avoided.

In the above embodiment, although the projection formed at the lower portion of the front end portion 4 of the leader block 3 is formed by the semi-spherical projection 26, the present invention is not to be restricted to this embodiment. For example, as shown in FIG. 10, the projection may be formed as a slanting portion 18 which is slanting outwardly from the upper to the lower end of the front end portion 4, and based on the principle of the present invention, many other modifications may be possible so long as the front end portion has such a shape that its lower portion can be abutted against the side wall of the case.

As described above, in the magnetic tape cartridge according to the present invention, the relief portion is provide on the partition wall of the cartridge case so that when the leader block is rotatably moved horizontally about a point of contact between the curved surface formed on the rear end of said leader block and the portion of the partition wall which serves as the fulcrum, so as to be attached to and detached from the cartridge case, the fulcrum is disposed between the longitudinal center line of the leader block and a point disposed inwardly of this center line with respect to the cartridge. Therefore, when the front end portion of the leader block is rotated against the resiliency of the side wall of the cartridge case so as to be inserted into the cartridge case, the attaching force acting on the withdrawing pin at the time of attaching the leader block can be reduced to a load generally equal to the withdrawing force acting on the withdrawing pin at the time of withdrawing the leader block from the cartridge case. Therefore, the attaching force and detaching force acting on the withdrawing pin at the time of attaching and detaching the leader block can be stabilized.

As described above, in the magnetic tape cartridge according to the present invention, a low friction coefficient material is provide on the front end portion of the leader block to reduce the frictional resistance between the front end portion of the leader block and the side wall of the case. Therefore, the forces for attaching and detaching the leader block are small, can be stabilized, and can be set quite easily. Therefore, according to the present invention, there is less risk regarding breakage of the case, breakage of the block and bending deformation of the withdrawing pin due to excessive loads developing when attaching and detaching the leader block and due to irregularities in the attaching and detaching forces, so that there can be provided the magnetic tape cartridge which is highly reliable.

As further described above, in the magnetic tape cartridge according to the present invention, a projection is formed on the lower portion of the front end portion of the leader block and is abutted against part of the side wall of the cartridge so as to suitably deform the side wall. Therefore, the position where the withdrawing pin acts on the leader block to apply the attaching and detaching force thereto and the position where the front end portion of the leader block acts on the side wall to apply the abutting force thereto are disposed in a generally common plane. Therefore, the twisting force exerted on the withdrawing pin 13 due to the inconsistency between the directions of acting of the above-mentioned attaching and detaching force and abutting force is alleviated.

Therefore, according to the present invention, there is less risk such as the deformation of the withdrawing pin, which can provide the highly reliable magnetic tape cartridge.

We claim:

1. A magnetic tape cartridge, comprising:
    a tape cartridge having a tape outlet at least partially defined by a partition wall an a side wall;
    a tape reel rotatably disposed in said tape cartridge and having a magnetic tape wound therearound;
    a leader block for securing an end of said tape and being detachably disposed in said tape outlet, said leader block having at one end thereof a curved surface for contacting a portion of said partition wall and having at another end thereof an abutting member for abutting against said side wall of said cartridge, said side wall at point of contact with said abutting member being deformable away from said abutting member to allow for attachment and detachment of said leader block, wherein a relief portion is provided on said partition wall so that when said leader block is rotated about a point of contact between said curved surface of said leader block and said portion of said partition wall so as to be attached and detached to said tape outlet, said point of contact is disposed between a longitudinal center line of said leader block and a point located toward the center of said cartridge from said center line.

2. The magnetic tape cartridge according to claim 1, wherein said abutting member has a low coefficient of friction such that the force required to attach and detach said leader block to said tape outlet is uniform.

3. The magnetic tape cartridge according to claim 1, wherein a projection is formed on a portion of said abutting member, said projection being in contact with said side wall so as to uniformly deform said side wall.

4. A magnetic tape cartridge, comprising;
    a tape cartridge having a tape outlet at least partially defined by a partition wall and a side wall;
    a tape reel rotatably disposed in said tape cartridge and having a magnetic tape wound therearound;
    a leader block for securing an end of said tape and being detachably disposed in said tape outlet, said leader block having at one end thereof a curved surface for contacting a portion of said partition wall and having at another end thereof an abutting member for abutting against said side wall of said cartiridge, said side wall being deformable to allow for attachment and detachment of said leader block, wherein said abutting member has a low coefficient of friction such that the force required to attach and detach said leader block to said tape outlet is uniform.

5. A magnetic tape cartridge, comprising:
    a tape cartridge having a tape outlet at least partially defined by a partition wall and a side wall:
    a tape reel rotatably disposed in said tape cartridge and having a magnetic tape wound therearound:
    a leader block for securing an end of said tape and being detachably disposed in said tape outlet, said leader block having at one end thereof a curved surface for contacting a portion of said partition wall and having at another end thereof an abutting member for abutting against said side wall of said cartiridge, said side wall being deformable to allow for attachment and detachment of said leader block, wherein a projection is formed on a portion of said abutting member, said projection being in contact with said side wall so as to uniformly deform said side wall.

* * * * *